Feb. 21, 1928.
M. REPPE
1,660,177
LAWN EDGER
Filed July 7, 1927
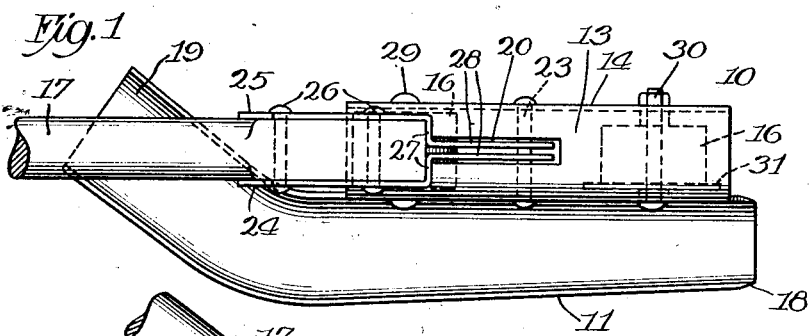
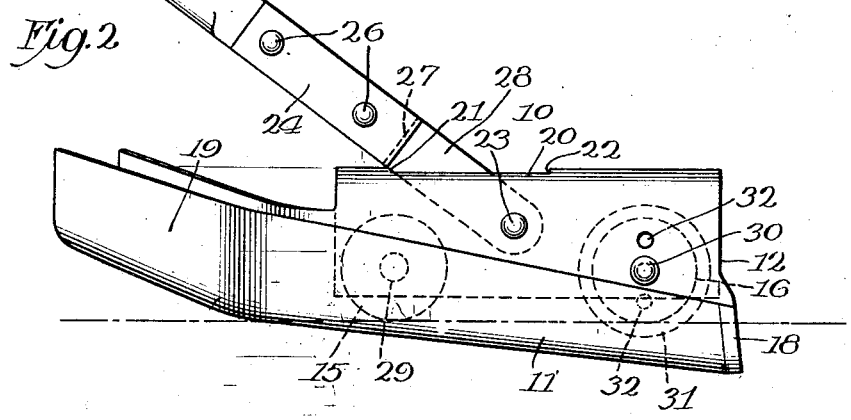
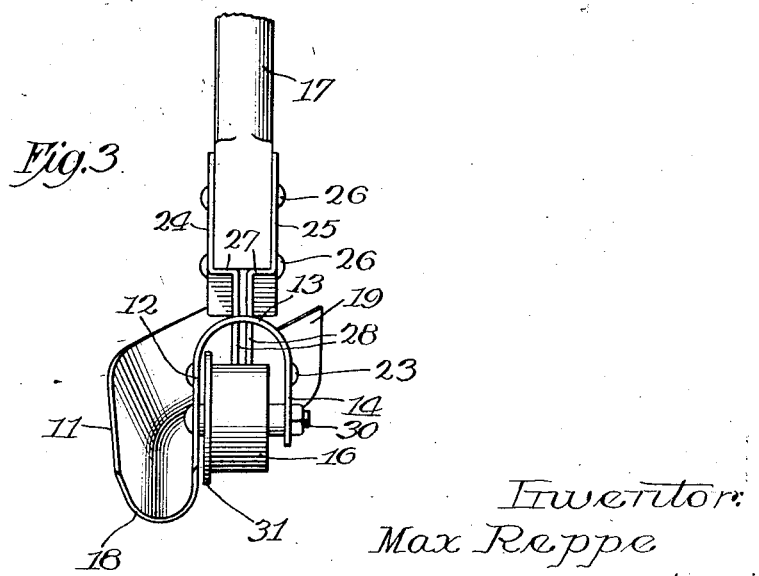
Inventor:
Max Reppe
By Williams, Bradbury, McCabe & Hinkle
Attys.

Patented Feb. 21, 1928.

1,660,177

UNITED STATES PATENT OFFICE.

MAX REPPE, OF CHICAGO, ILLINOIS.

LAWN EDGER.

Application filed July 7, 1927. Serial No. 203,964.

My invention relates to lawn edgers and is more particularly concerned with the provision of a simple and economical type of edger which is adapted to make a narrow channel in the soil at the edge of the lawn and also to sever the vegetation projecting over on the sidewalk.

One of the objects of my invention is the provision of an edger of the class described which is adapted to produce a cut of uniform depth, discharging the grass and soil on the sidewalk where it can be easily removed.

Another object of my invention is the provision of an edger of the class described comprising a novel, simple and economical assembly of parts which are easily manufactured and assembled and which comprises a sheet metal trough formed with integral flanges for supporting the wheels and a handle without the use of other expensive parts.

Other objects and advantages of my invention will appear more fully from the following description and from the accompanying drawings, in which similar characters of reference indicate similar parts throughout the several views.

Referring to the drawings:

Fig. 1 is a plan view of my lawn edger,

Fig. 2 is a side elevational view of the same,

Fig. 3 is a front elevational view of the same.

In the drawings, 10 indicates in its entirety my lawn edger which comprises a stamped sheet metal trough 11 having an upwardly extending flange or wall 12 which is bent laterally as at 13 and downwardly as at 14 to provide a support for a pair of wheels 15 and 16, as well as a handle 17. The trough 11 may be of substantially U-shape at its forward edge 18 which is beveled to a sharp cutting edge, and the trough is upwardly inclined to the rear in order to lift the material dug up by the edge 18 and discharge it behind the edger.

The trough is preferably provided with a lateral extension 19 at its rear end which is adapted to discharge the dirt and grass upon the sidewalk where it can be conveniently swept up and removed, and the trough preferably increases in width and depth toward its rear end in order to accommodate the increased volume of the loosened dirt and vegetation.

The trough 11 with the supporting flanges 13 and 14 is preferably constructed of a single stamping of sheet steel and the lateral flange 13 is provided with an elongated slot 20 in order to accommodate the lower end of the handle 17. The slot 20 is preferably of substantially rectangular form and of sufficient length so that the ends 21 and 22 of the slot may serve as stop members, limiting the pivotal movement of the handle 17 relative to the edger.

If desired the handle 17 may be directly attached to the flanges 12 and 14 of the edger, the handle extending through the slot 20 and being secured by a rivet 23 passing through the handle and both flanges. However, the space between the flanges 12 and 14 may too narrow to receive a handle of sufficient strength and for this reason I prefer to provide a pair of sheet metal brackets 24 and 25 which may be secured to the handle by a pair of bolts or rivets 26. The brackets 24 and 25 may comprise strips of ordinary strap iron or strips of sheet steel which are provided with apertures for the bolts 26 and which are inwardly bent as at 27 so that the ends of the brackets 28 may extend parallel to each other through the slot 20.

The ends 28 are provided with aligned apertures to receive the bolt or rivet 23 and it will thus be observed that the handle 17 is pivotally attached to the edger in such manner that the handle may be used at convenient height for any normal person. The ends of the slot 20 provide limiting stops for the movement of the handle so that the handle will always project upward at approximately the angle at which it can be most conveniently grasped.

The edger 10 is provided with a pair of wheels or rollers 15 and 16 which are rotatably secured between the flanges 12 and 14 by bolts or rivets 29 and 30, passing through both flanges and through the wheels. The forward wheel 16 is preferably provided with a flange 31 which is adapted to maintain the edger upon the edge of the sidewalk or other structure surrounding the lawn, while the rear wheel 15 may be smooth in order that it may slide laterally of the sidewalk and assume any position necessary to guide the edger about a curved walk. The flanges 12 and 14 are preferably provided with a plurality of holes 32 adapted to receive the bolt 30 in order that the height of the first wheel may be adjusted to regulate the depth of the cut.

The provision of a pair of wheels enables my edger to make a trench of uniform depth at any adjustment of the front wheel without the necessity of any skill in operating the edger or any particular attention to the depth of cut during the operation. The construction of my edger of a single stamping which is adapted both to support the wheels and the handle, provides an edger of durable and efficient structure which may be easily manufactured and assembled and which may be constructed at a very small fraction of the cost of the edgers of the prior art. The operation of my edger will be obvious to those skilled in the art. The flanged wheel 16 is located at the edge of the sidewalk and the handle 17 is pushed forward while held in substantial alignment with the edge of the sidewalk. The sharp edge 18 of the trough cuts into the grass and earth adjacent the sidewalk, making a narrow trench and severing the grass projecting over on the sidewalk. As the edger progresses the grass and dirt are forced backward through the trough 11 and discharged on the sidewalk through the lateral extension 19 of the trough 11.

It will thus be observed that I have invented a novel and simple assembly of parts forming a lawn edger which is adapted to be shoved along the edge of the sidewalk to dress the edge of the lawn and discharge the dirt and soil upon the sidewalk and that my edger is more simple, economical and efficient than the edgers of the prior art which embody a great many different parts.

While I have illustrated and described a specific embodiment of my invention, many modifications may be made without departing from the spirit of the invention, and I do not wish to be limited to the precise details of construction set forth but desire to avail myself of all changes within the scope of the appended claims.

Having thus described my invention, what I desire to secure by Letters Patent of the United States is:

1. In a lawn edger, the combination of a stamped sheet metal trough having a sharpened forward edge for cutting the grass and soil, said trough having an upwardly extending central wall and a side wall bent down on the other side of said central wall from said trough and a wheel rotatably secured in between said central wall and side wall.

2. In a lawn edger, the combination of a stamped sheet metal trough having a sharpened forward edge for cutting the grass and soil, said trough having an upwardly extending central wall and a side wall bent down on the other side of said central wall from said trough and a pair of wheels rotatably supported between said central wall and side wall.

3. In a lawn edger, the combination of a stamped sheet metal member comprising an inclined trough having a sharp forward edge, one of the walls of said trough having an upwardly extending flange with a lateral bend and a downwardly extending flange, a pair of wheels supported between said flanges, said bend having a slot formed in the same and a handle pivotally secured in said slot.

4. In a lawn edger, the combination of a stamped sheet metal member comprising an inclined trough having a sharp forward edge, one of the walls of said trough having an upwardly extending flange with a lateral bend and a downwardly extending flange, a pair of wheels supported between said flanges, said bend having a slot formed in the same and a handle pivotally secured in said slot, said trough having a lateral extension arranged to discharge the grass and dirt on the sidewalk.

5. In a lawn edger, the combination of a stamped sheet metal member comprising an inclined trough having a sharp forward edge, one of the walls of said trough having an upwardly extending flange with a lateral bend and a downwardly extending flange, a pair of wheels supported between said flanges, said bend having a slot formed in the same and a handle pivotally secured in said slot, said trough having a lateral extension arranged to discharge the grass and dirt on the sidewalk and a handle passing through said slot and pivotally secured between said flanges.

In witness whereof, I hereunto subscribe my name this 1st day of July, 1927.

MAX REPPE.